US005617715A

United States Patent [19]
Beèr et al.

[11] Patent Number: 5,617,715
[45] Date of Patent: Apr. 8, 1997

[54] INVERSE COMBINED STEAM-GAS TURBINE CYCLE FOR THE REDUCTION OF EMISSIONS OF NITROGEN OXIDES FROM COMBUSTION PROCESSES USING FUELS HAVING A HIGH NITROGEN CONTENT

[75] Inventors: János M. Beèr, Winchester, Mass.; Majed A. Toqan, Avon, Conn.

[73] Assignee: Massachusetts Institute of Technology, Cambridge, Mass.

[21] Appl. No.: 340,154

[22] Filed: Nov. 15, 1994

[51] Int. Cl.$^6$ .................. F02G 3/00; F02G 6/00
[52] U.S. Cl. .................. 60/39.02; 60/39.182; 60/732; 423/235
[58] Field of Search .................. 60/39.02, 39.12, 60/39.464, 39.465, 39.5, 39.182, 39.52, 732; 422/182, 183; 423/235

[56] References Cited

U.S. PATENT DOCUMENTS

| | | |
|---|---|---|
| 3,150,487 | 9/1969 | Mangan et al. . |
| 3,194,015 | 7/1965 | Pacault .................. 60/39.182 |
| 3,232,713 | 2/1966 | Felder, Jr. .................. 422/183 |
| 3,703,807 | 11/1972 | Rice . |
| 3,791,137 | 2/1974 | Jubb et al. .................. 60/39.463 |
| 3,873,845 | 3/1975 | Osthaus .................. 60/39.182 |
| 3,957,418 | 5/1976 | Sata . |
| 3,971,211 | 7/1976 | Wethe et al. .................. 60/39.182 |
| 4,154,567 | 5/1979 | Dahmen .................. 422/182 |
| 4,271,664 | 6/1981 | Earnest . |
| 4,313,300 | 2/1982 | Wilkes et al. . |
| 4,342,192 | 8/1982 | Heyn et al. . |
| 4,353,206 | 10/1982 | Lee . |
| 4,362,013 | 12/1982 | Kuribayashi . |
| 4,426,842 | 1/1984 | Collet . |
| 4,468,928 | 9/1984 | Suzuki . |
| 4,502,277 | 3/1988 | Papastavros .................. 60/39.181 |
| 4,519,207 | 5/1985 | Okabe et al. . |
| 4,519,993 | 5/1985 | McGill et al. .................. 423/235 |
| 4,539,918 | 9/1985 | Beer et al. .................. 60/39.464 |
| 4,569,197 | 1/1986 | Adrian et al. . |
| 4,845,940 | 7/1989 | Beèr . |
| 4,875,436 | 10/1989 | Smith et al. . |
| 4,928,635 | 5/1990 | Shelor . |
| 4,936,088 | 6/1990 | Bell . |
| 4,974,411 | 12/1990 | Brückner et al. . |
| 4,996,836 | 3/1991 | Reh et al. .................. 60/39.12 |
| 5,044,152 | 9/1991 | Hoizumi et al. . |
| 5,069,685 | 12/1991 | Bissett et al. .................. 60/39.12 |
| 5,078,752 | 1/1992 | Mach et al. . |
| 5,139,755 | 8/1922 | Seeker et al. .................. 423/235 |
| 5,148,668 | 9/1992 | Frutschi . |
| 5,174,107 | 12/1992 | Ogawa et al. . |
| 5,255,507 | 10/1993 | Gounder .................. 60/39.12 |
| 5,265,410 | 11/1993 | Hisatome .................. 60/39.12 |
| 5,339,621 | 8/1994 | Tolman .................. 60/39.12 |

FOREIGN PATENT DOCUMENTS

| | | |
|---|---|---|
| 3-36409 | 3/1991 | Japan . |
| 4-8804 | 4/1992 | Japan . |

Primary Examiner—Timothy Thorpe
Assistant Examiner—Ted Kim
Attorney, Agent, or Firm—Weingarten, Schurgin, Gagnebin & Hayes LLP

[57] ABSTRACT

An inverse combined steam-gas turbine cycle is disclosed. In the steam cycle, a fuel having a high nitrogen content such as coal or heavy fuel oil is burned in a boiler to raise steam to power a steam turbine. In the gas turbine cycle, a hydrocarbon fuel such as natural gas is burned in a gas combustor to power a gas turbine. The compressed exhaust gas (40, 42) from the steam cycle combustion is introduced into the gas combustor, where nitrogen oxides ($NO_x$) in the exhaust gas may be reduced through reactions with the hydrocarbon fuel.

7 Claims, 2 Drawing Sheets

INVERSE COMBINED STEAM-GAS TURBINE CYCLE FOR THE REDUCTION OF EMISSIONS OF NITROGEN OXIDES FROM COMBUSTION PROCESSES USING FUELS HAVING A HIGH NITROGEN CONTENT

FIELD OF THE INVENTION

This invention relates to pollution control, and more particularly to pollution control for coal-fired combustion processes.

BACKGROUND OF THE INVENTION

For many years, steam has been reliably used for electric power generation, various process needs, or both. The basic steam generation process operates on the Rankine cycle. Water is fed to a boiler where it is evaporated to generate high pressure steam. Coal is a common fuel for firing steam boilers, although other fuels may be used. The steam is expanded in a turbine which drives a generator. The steam may be condensed and returned to the cycle, or passed out to be used in industrial processes. Many modifications of this basic steam cycle are possible.

The steam cycle has also been used in combination with a gas-turbine cycle for various purposes. In the basic gas-turbine cycle, following the Brayton or Joule cycle, a working fluid, typically air, is compressed, heated, and then expanded in a turbine to drive a generator. The compressor is generally mounted on the same shaft with the turbine so that the turbine is used to drive the compressor as well. A variety of fuels, such as natural gas, kerosene, or diesel fuels, may be burned in a gas turbine combustor to heat the working fluid. The working fluid is typically air, which is also a source of oxygen for combustion processes, mixed with the combustion products from the fuel. Thus, the fuel must be relatively clean to avoid damaging the turbine blades.

Gas turbines typically exhaust gas at temperatures which are greater than the temperatures needed to generate steam. Thus, in the combined steam-gas turbine cycle, the exhaust from the gas turbine may be introduced into a heat recovery boiler to generate the steam for the steam turbine. Supplementary fuels may be added to the heat recovery boiler in some cases. The gas turbine cycle may also be used as a supplement during peak power loads or start-up of the steam cycle.

A drawback to combustion processes which burn fossil fuels, such as coal, fuel oil, or natural gas, is the generation of harmful pollutants. Oxides of nitrogen or $NO_x$, NO and $NO_2$, are such pollutants which are linked to acid rain and the production of smog. $NO_x$ emissions from coal combustion originate mainly from the nitrogen compounds organically bound in the fuel, whereas $NO_x$ emissions formed in natural gas flames are due to the fixation of atmospheric nitrogen at high temperatures and oxidizing atmospheres (thermal $NO_x$).

Various techniques for reducing $NO_x$ emissions are in practice. Thermal $NO_x$ formation is temperature dependent and occurs rapidly at temperatures greater than 1800 K. Thus, controlling the temperature in the combustion zone to remain below approximately 1800 K. is effective in controlling thermal $NO_x$ formation.

Staged combustion, in which a first fuel-rich combustion zone is followed by a second fuel-lean combustion zone, is effective in reducing $NO_x$ emissions. See, for example, U.S. Pat. No. 4,845,940 to Beér. In the fuel-rich zone, less than the stoichiometric amount of combustion air is supplied, resulting in less available oxygen to react with the nitrogen. Thus, the nitrogen is more likely to convert to $N_2$ rather than $NO_x$. The rest of the combustion air is introduced downstream from the first combustion zone in a fuel-lean zone to complete the combustion. Also, staging the supply of air into the combustion zone tends to stabilize the temperature, which minimizes thermal $NO_x$ formation.

Another $NO_x$ emission control method which has been demonstrated to be technically and economically feasible is the $NO_x$ "reburn" method. This method is based on the high temperature reactions between $NO_x$ and hydrocarbon fragments in fuel rich atmospheres. A hydrocarbon fuel such as natural gas is injected into hot $NO_x$-bearing combustion products in such a way that the fuel-air mixture ratio becomes fuel rich. A fraction of the $NO_x$ in the combustion products reacts through a series of reactions with the hydrocarbon fragments to give molecular nitrogen, $N_2$. Following the $NO_x$ reducing reactions more air has to be injected to achieve complete combustion. This technique may be applied by recirculating flue gas from a furnace or boiler back into a natural gas or oil fired burner from which the gas was originally generated.

SUMMARY OF THE INVENTION

The present invention provides a system for $NO_x$ emission reduction from boilers which burn fuels having a high nitrogen content, such as coal or a heavy fuel oil. An inverse combined steam-gas turbine cycle is provided. In the steam cycle, the fuel is burned in a boiler to raise steam to power a steam turbine. In the gas turbine cycle, a hydrocarbon fuel such as natural gas is burned in a gas combustor to power a gas turbine. The exhaust gas from the steam cycle combustion is introduced through a compressor into the gas combustor, where nitrogen oxides ($NO_x$) in the exhaust gas may be reduced through reactions with the hydrocarbon fuel. Thus, the combined cycle is the inverse of combined steam-gas turbine cycles known in the prior art, in which exhaust from the gas turbine cycle is introduced into the steam turbine cycle.

In the present invention, substantially all of the steam cycle flue gas may be introduced into the gas-turbine cycle. A compressor for the flue gas is provided to compress the flue gas to the predetermined input pressure for the gas combustor. The size of the compressor and gas combustor are determined by the amount of flue gas generated. Prior to entry into the compressor, the flue gas is preferably cooled to maximize its density, thereby minimizing the work input to the compressor, and any liquid droplets are removed. A scrubber to remove sulfur compounds and an electrostatic precipitator to remove particulates are also provided in the flue gas exhaust line upstream of the compressor. In this manner, the present invention effectively reduces the $NO_x$ emissions from a fossil fuel exhaust gas. If desired, the exhaust gas from the gas turbine may be utilized in the steam-turbine cycle.

DESCRIPTION OF THE DRAWINGS

The invention will be more fully understood from the following detailed description taken in conjunction with the accompanying drawings in which.

DETAILED DESCRIPTION OF THE INVENTION

Figure 1:
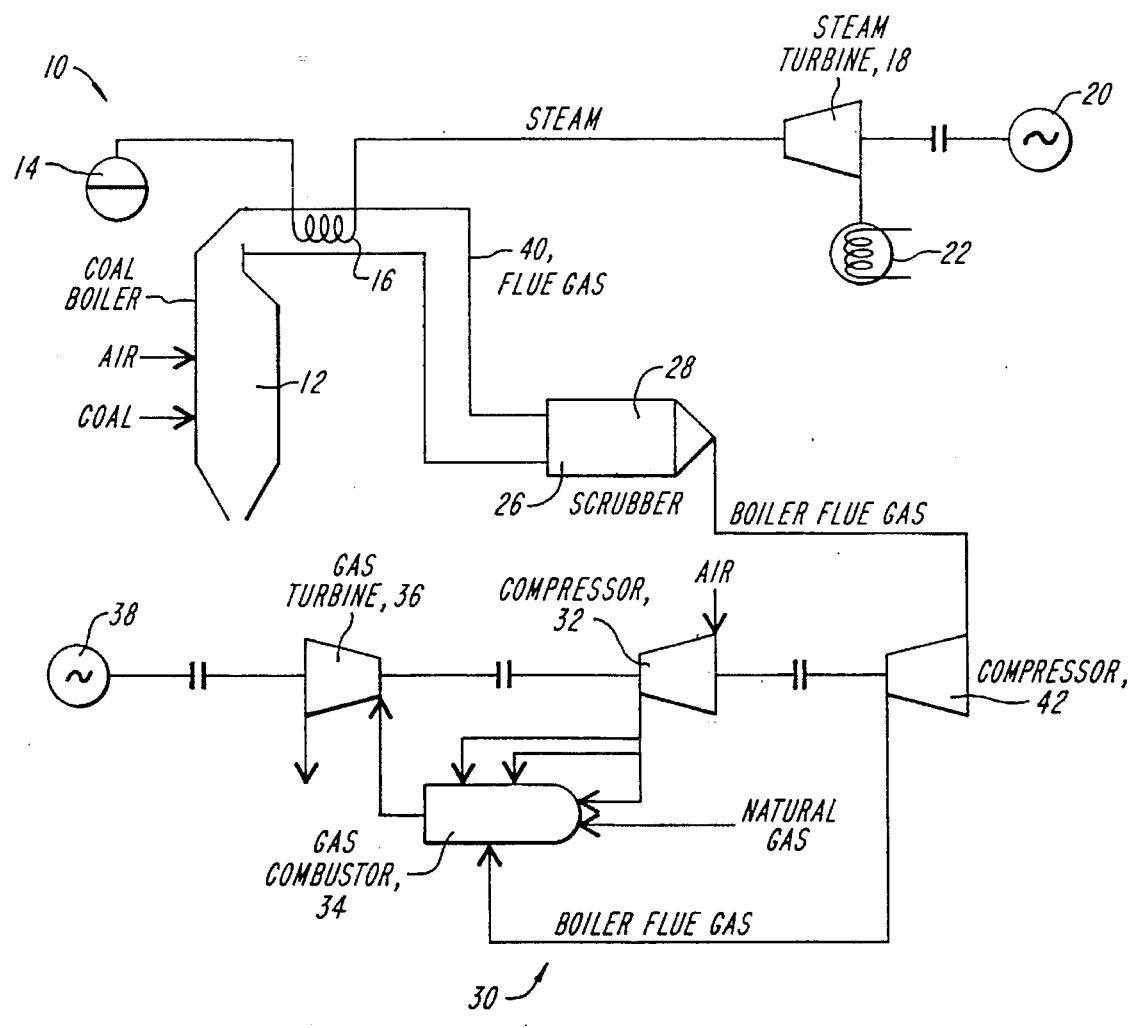
FIG. 1 is a schematic diagram of the present invention.

The present invention is illustrated schematically in FIG. 1. A steam turbine cycle, shown generally at 10, includes a boiler 12 which is fired by a high nitrogen content fuel, such as coal or a heavy fuel oil. Any suitable boiler may be used. Combustion air and fuel are introduced to the boiler and burned. The flue gas from the fuel boiler, which is at atmospheric pressure, typically contains, among other things, $NO_x$, $SO_x$, particulates and water vapor.

Water, from a supply 14, is circulated via suitable steam tubes 16 through the boiler to generate steam. Preferably, the steam should be superheated and reheated to maintain high cycle efficiency and avoid turbine damage due to excessive moisture content at low pressure. The steam, expanded in a steam turbine 18 for operation of a power generator 20, may be either condensed at low pressure in a condenser 22 and recycled back to the boiler or passed out as process steam at a back pressure. Other modifications to the basic cycle are possible without affecting the present invention. For example, a reheater between turbine stages may be provided. Similarly, a regenerator for preheating the boiler feedwater may be employed.

A gas turbine cycle is shown generally at 30 in FIG. 1. A compressor 32 is provided to increase the pressure of the combustion air. The compressed combustion air and a hydrocarbon fuel such as natural gas constituting primarily methane are introduced into a gas combustor 34. The exhaust gas from the gas combustor is expanded in a gas turbine 36 which drives a generator 38. The gas turbine requires that the exhaust gas be substantially free of particulates and alkalies which can damage the turbine. As is typical in gas-turbine cycles, the turbine is also used to power the compressor.

In the present invention, the flue gas from the steam cycle boiler 12 is introduced into the gas-turbine cycle 30. The flue gas passes along ducting 40 during which it begins to cool. A scrubber 26 to remove the sulfur compounds and an electrostatic precipitator 28 to remove the particulates are provided. Any suitable type of electrostatic precipitator and scrubber may be used. Similarly, any other device or method of removing particulates and sulfur compounds may be provided. Leaving the scrubber and precipitator, the flue gas typically is at approximately 40° C. and has approximately 4% $O_2$, 700 ppm particulates, and 200 ppm sulfur compounds.

Prior to its introduction into the gas combustor 34, the pressure of the flue gas must be increased in a compressor 42 to the predetermined entering pressure of the combustor. Any suitable compressor, such as a centrifugal compressor or an axial flow compressor may be used. The compressor 42 is preferably powered by the gas turbine 36. If desired, a single compressor for the combustion air and the flue gas may be provided.

The gas exiting the scrubber may be fully saturated with water. To ensure no liquid droplets are carried over to the compressor, any liquid present may be removed by any suitable manner known in the art. Also, to increase the efficiency of the compressor and reduce the back work from the turbine to operate the compressor, the gas entering the compressor should be at an increased density. The maximum density practically achievable is dependent on various operating parameters, such as the temperature, moisture content, and sulphur content of the flue gas exiting the scrubber and the precipitator, and may be maximized in any suitable manner dependent on such parameters in ways known in the art.

After exiting the compressor 42, the flue gas is introduced into the combustor 34 along with a hydrocarbon fuel, such as natural gas, and combustion air. The combustor is designed to provide a first fuel-rich zone or stage and a second fuel-lean zone or stage. Fuel-rich and fuel-lean zones may be formed by staging the introduction of the combustion air into the combustor, such that less than the theoretical amount of air is available in the fuel-rich zone and more than the theoretical amount of air is available in the fuel-lean zone. In the present invention, the fuel and the combustion air are introduced into the combustor and mixed in the fuel-rich zone. Approximately two-thirds the stoichiometric amount of combustion air is used. Pyrolysis of the fuel occurs in the fuel-rich zone at a high temperature in the range of 1300° to 1500° K., generating hydrocarbon fragments. Steam cycle flue gas is then introduced and a fraction of the $NO_x$ in the flue gas is converted to cyanide by reactions with $CH_i$ radicals from the pyrolysis of the fuel, such as in the following reaction:

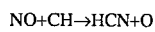

or

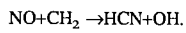

The cyanide reacts with radicals such as HNO, NCO, and HNCO to form amines, NH, $NH_2$, which further react with NO to give molecular nitrogen, $N_2$. These reactions form $N_2$ at a rate that is dependent upon the amount of available $O_2$ and the temperature of the fuel-rich flame zone.

To complete the combustion, air is introduced into the combustor in the fuel-lean zone to burn off the combustibles from pyrolysis in the fuel-rich zone. This combustion in the fuel-lean zone is subject to temperature rises, which could lead to thermal $NO_x$ formation by the Zeldovich mechanism if the temperature exceeds about 1800 K. Thus, reducing the flame temperature in the lean zone controls thermal $NO_x$ formation. The temperature can be effectively controlled by staging the introduction of the combustion air to prevent excessive temperatures. Preferably, the temperature is maintained at approximately 1450 K. to 1500 K. in the fuel lean zone.

The amount of $NO_x$ in the exhaust gas from the combustor is typically less than approximately 100 ppm. The gas is then passed to the gas turbine 36.

Figure 2:
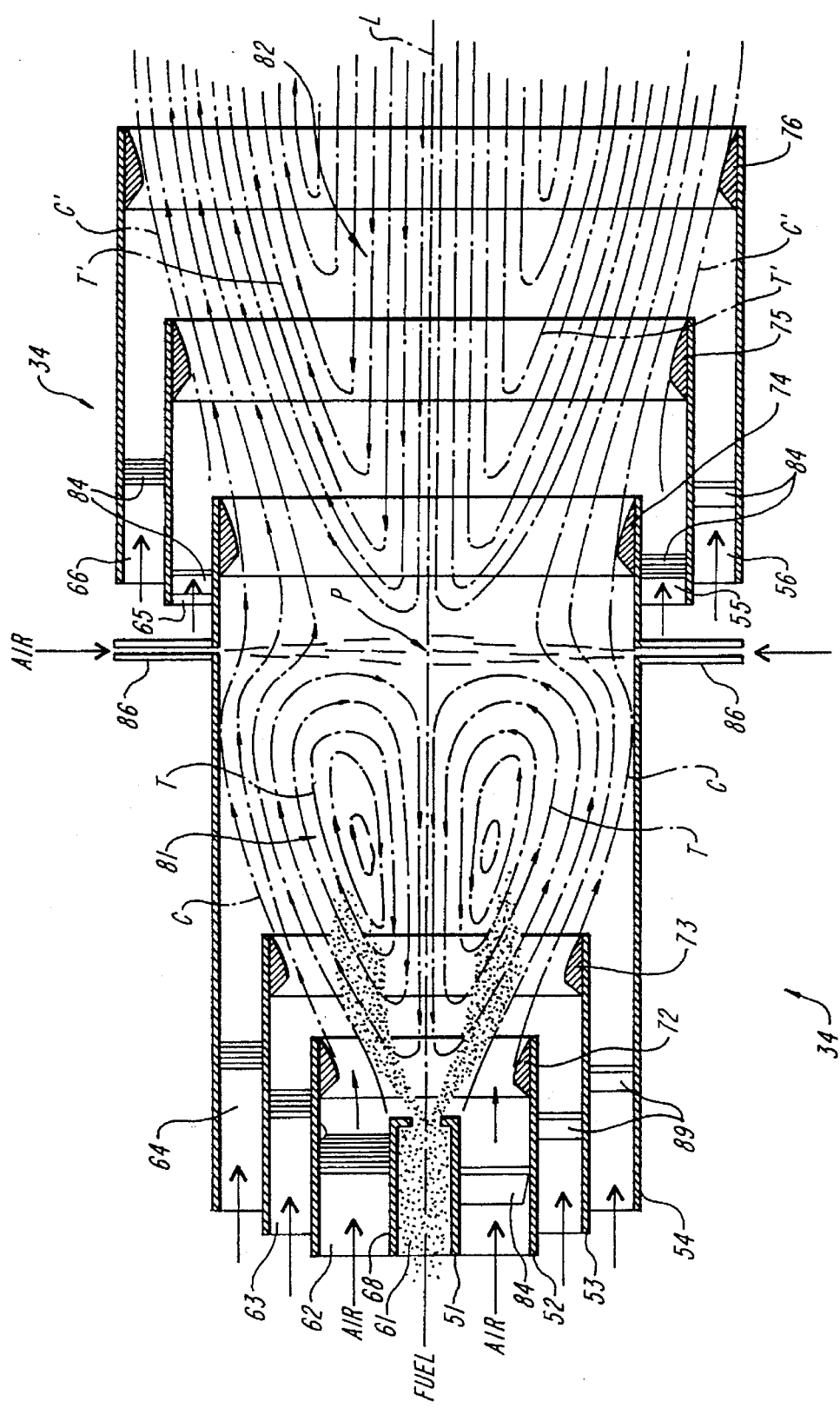
FIG. 2 is an illustration of a gas turbine combustor for use in the present invention.

A suitable gas turbine combustor is shown in FIG. 2, although other combustor designs may be used. The combustor comprises several concentrically arranged cylindrical pipes 51, 52, 53, 54, 55, 56. Six pipes are shown, although any suitable number may be used. The central pipe 51, having an opening 61 along the longitudinal axis L, defines a fuel jet or inlet nozzle 68. The remaining pipes 52–56 each define an annular passage 62, 63, 64, 65, 66 respectively, each having an inlet opening, as shown by the flow arrows. Annular converging-diverging nozzles 72, 73, 74, 75, 76 are located at corresponding outlet openings of the pipes. These nozzles serve to form gaseous envelopes encompassing toroidal vortices T, T', thereby defining a first combustion cavity 81 and a second combustion cavity 82 within the combustor. To achieve proper flame stabilization and combustion in the first cavity 81, the axial spacing between the nozzles 72, 73, and 74 should be sufficiently large to maintain proper separation of the vortices in the first and second cavities.

The fuel-rich stage forms within the first cavity 81, defined by the first three nozzles 72, 73, and 74. The axial spacing of the first three nozzles increases in relation to their radial distance from the combustor axis L to define a divergent cavity with a substantially concave outer boundary C. Fuel, in liquid, gaseous, or slurry form, is injected into the first cavity 81 through the fuel jet 68. Air is introduced through the annular passages 62 and 63 to mix with the fuel. The amount of air ranges from 0.5 to 0.7 of the stoichiometric amount of air. Preferably, approximately two-thirds the stoichiometric amount of air is introduced. Flue gas from the steam cycle is introduced through annular passage 64 to mix with the fragments from the pyrolysis of the fuel. The ratio of fuel to flue gas is in the range of about 0.1 to 0.05.

A toroidal vortex pattern in which flow is recirculated along the longitudinal axis L toward the fuel jet 68, shown by streamlines T, is generated in the first cavity 81 by the swirling flow. The vortex pattern provides thorough mixing of the reactants to aid the conversion reactions of $NO_x$ in the flue gas to $N_2$. Thorough mixing also provides fast vaporization of fuel in the liquid state and minimizes soot formation. A stagnation pressure area P forms downstream of the toroidal vortex T, which stabilizes and separates between the vortices T, T' in the first and second cavities.

The fuel-lean stage forms within the second cavity 82, which is immediately downstream from the first cavity and defined by the last three nozzles 74, 75, and 76. The nozzle 74 serves as both the outermost nozzle of the first cavity and the innermost nozzle of the second cavity. The three outermost nozzles 74, 75, and 76 are equally spaced apart in relation to their radial distance from burner axis L to define a second divergent cavity having a substantially straight-line outer boundary C'. Air, the gaseous reactant necessary for completing combustion and reducing the temperature in the fuel lean zone, is introduced through the annular passages 65 and 66 and mixes with the combustibles from the pyrolysis in the first stage. A second toroidal vortex with streamlines T' is generated within the envelope of the reactant entering the cavity through the annular passages. The combustion products of the first stage are rapidly cooled to at least 1600 K. and preferably to approximately 1250 K. to quench any thermal $NO_x$ formation, which is still high enough to complete the combustion of the products, carbon monoxide, hydrocarbons, and soot, from the first cavity. Also in this combustor design, high turbulent shear stresses arising between adjacent nozzles result in uniform distribution of fluid properties, such as gas temperature, across the cross section of the combustor, which is advantageous for gas turbine applications.

A plurality of turbine stator-type guide vanes 84 may be positioned at spaced circumferential intervals in each of the annular passages 62–66 to impart a swirl velocity component to gaseous reactant entering the passages. This rotation increases the efficiency of combustion and aids in the control of the gaseous temperatures in the two stages. The blade angle of the guide vanes may be fixed as known in the art for imparting a suitable rotation to the gaseous reactants.

To stabilize the toroidal vortices and further strengthen the recirculating flow of the fuel rich vortex, a ring of jets 86 may extend around the pipe 54 between the nozzles 73 and 74. Pressurized air is injected radially inward through these ring jets. The flow increases the stagnation pressure in the area P. After combustion in the fuel rich vortex T, the combustion products from the first cavity pass downstream into the second cavity 82 to complete combustion in the fuel lean vortex. Alternatively, a throat may be provided by forming one or more of the pipes with a converging-diverging shape, as shown, for example, in U.S. Pat. No. 4,845,940.

The size of the gas turbine cycle is determined by the amount of flue gas to be processed in the gas-turbine cycle, which is determined by the size of the steam cycle. If all of the flue gas from a typical steam cycle is to be processed, a relatively large gas turbine relative to the steam cycle boiler will be required. Turbines of this size are larger than necessary for applications such as operating heat recovery boilers or handling peak power loads for steam cycles.

The exhaust gas from the gas turbine may be introduced into the steam cycle if desired. For example, the hot exhaust could be used directly for the production of steam, along with coal as an additional fuel. Improved cycle efficiencies typically result in such a combined cycle.

The invention is not to be limited by what has been particularly shown and described, except as indicated by the appended claims.

We claim:

1. A process for removing $NO_x$ emissions from a boiler fired by a high nitrogen content fuel, comprising:

burning a high nitrogen content fuel in a boiler at atmospheric pressure to generate steam for a steam-turbine cycle and a waste gas including oxides of nitrogen;

burning a hydrocarbon fuel in a gas turbine combustor for a gas-turbine cycle to clean said waste gas of the oxides of nitrogen and to generate power;

compressing said waste gas from said boiler to a predetermined entering pressure of said gas turbine combustor;

introducing said compressed waste gas from said boiler into a fuel rich zone of said gas-turbine combustor to react with pyrolyzed fragments of said hydrocarbon fuel to convert $NO_x$ in said waste gas to $N_2$;

adding an oxidant to said gas turbine combustor to complete combustion; and directing exhaust gas from said combustor to a gas turbine.

2. The process of claim 1, further comprising removing sulfur compounds from said waste gas prior to entering said compressor to minimize damage to said gas turbine.

3. The process of claim 2, further comprising removing particulates from said waste gas prior to entering said compressor to minimize damage to said gas turbine.

4. The process of claim 3, wherein said particulates are removed at below 4 ppm.

5. The process of claim 1, wherein said hydrocarbon fuel comprises natural gas.

6. The process of claim 1, wherein substantially all of said waste gas is compressed and introduced into said gas combustor.

7. The process of claim 1, wherein said gas turbine combustor comprises a first fuel-rich combustion zone and a second fuel-lean combustion zone, and said compressed coal waste gas is introduced into said first fuel-rich zone at a downstream location, whereby said waste gas mixes with pyrolyzed hydrocarbon fragments of said fuel.

* * * * *

UNITED STATES PATENT AND TRADEMARK OFFICE
CERTIFICATE OF CORRECTION

PATENT NO.   : 5,617,715
DATED        : April 8, 1997
INVENTOR(S)  : János M. Beèr, et al.

It is certified that error appears in the above-identified patent and that said Letters Patent is hereby corrected as shown below:

Column 6, line 61, "coal waste gas" should read
--waste gas--.

Signed and Sealed this

Sixth Day of October, 1998

Attest:

BRUCE LEHMAN

*Attesting Officer*   *Commissioner of Patents and Trademarks*